United States Patent
Coult et al.

(10) Patent No.: US 11,853,807 B1
(45) Date of Patent: *Dec. 26, 2023

(54) CLUSTER SCALING BASED ON TASK STATE INFORMATION

(71) Applicant: Amazon Technologies, Inc., Seattle, WA (US)

(72) Inventors: Nicholas Ashton Coult, Bellevue, WA (US); David Michael Westbrook, Seattle, WA (US); Anoop Kapoor, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/109,054

(22) Filed: Dec. 1, 2020

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/5072* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,844,480 B2 | 11/2010 | Ricketts | |
| 8,898,402 B1 * | 11/2014 | Stronge | G06F 3/0605 711/100 |
| 9,110,496 B1 | 8/2015 | Michelsen | |
| 9,152,441 B2 * | 10/2015 | Anderson | G06F 9/455 |
| 9,164,802 B2 | 10/2015 | Netto | |
| 9,256,467 B1 | 2/2016 | Singh et al. | |
| 9,549,038 B1 | 1/2017 | Anne | |
| 9,667,498 B2 * | 5/2017 | Wu | H04L 41/0896 |
| 9,848,041 B2 * | 12/2017 | Einkauf | G06F 9/5077 |
| 9,898,347 B1 * | 2/2018 | Gupta | G06F 9/5027 |
| 9,910,713 B2 | 3/2018 | Wisniewski et al. | |
| 9,928,108 B1 | 3/2018 | Wagner et al. | |
| 9,971,621 B1 | 5/2018 | Berg et al. | |
| 10,067,801 B1 | 9/2018 | Wagner | |

(Continued)

OTHER PUBLICATIONS

Sharifi et al. "VCE: A New Personated Virtual Cluster Engine for Cluster Computing", 2008 IEEE, 6 pages.*

(Continued)

*Primary Examiner* — Van H Nguyen
(74) *Attorney, Agent, or Firm* — Knobbe, Martens, Olson & Bear LLP

(57) ABSTRACT

Generally described, one or more aspects of the present application relate to scaling a cluster of compute capacity used to execute containerized applications or tasks. For example, a waiting area can be maintained, in which tasks that are requested to be executed in a cluster but are not able to be accommodated in the cluster due to the cluster not having sufficient compute capacity usable to execute such tasks are stored. The scaling of the cluster can be performed based on the characteristics of the tasks in the waiting area, such that the cost associated with adding too much compute capacity to the cluster can be reduced, while also reducing the time it takes to reach the desired level of compute capacity that can accommodate all of the requested tasks.

20 Claims, 6 Drawing Sheets

(56) References Cited

U.S. PATENT DOCUMENTS

| | | | |
|---|---|---|---|
| 10,135,712 B2* | 11/2018 | Wu | H04L 67/10 |
| 10,310,966 B1 | 6/2019 | Ge et al. | |
| 10,432,551 B1 | 10/2019 | Vosshall et al. | |
| 10,581,964 B2* | 3/2020 | Einkauf | H04L 67/10 |
| 10,606,660 B1 | 3/2020 | Hartley et al. | |
| 10,771,337 B1 | 9/2020 | Das et al. | |
| 10,824,474 B1 | 11/2020 | Kamboj et al. | |
| 10,871,995 B2 | 12/2020 | Gerdesmeier et al. | |
| 11,385,938 B2* | 7/2022 | Kim | H04L 43/0817 |
| 11,392,422 B1 | 7/2022 | Filiz et al. | |
| 11,403,150 B1 | 8/2022 | Featonby et al. | |
| 11,422,844 B1 | 8/2022 | Filiz et al. | |
| 11,487,591 B1 | 11/2022 | Featonby | |
| 11,573,816 B1 | 2/2023 | Featonby et al. | |
| 2005/0002375 A1* | 1/2005 | Gokhale | H04W 28/24 370/347 |
| 2008/0282267 A1 | 11/2008 | Adam et al. | |
| 2011/0246515 A1 | 10/2011 | Johnson et al. | |
| 2012/0210326 A1 | 8/2012 | Torr et al. | |
| 2012/0233668 A1 | 9/2012 | Leafe et al. | |
| 2013/0124807 A1 | 5/2013 | Nielsen et al. | |
| 2013/0160008 A1 | 6/2013 | Cawlfield et al. | |
| 2014/0079207 A1 | 3/2014 | Zhakov et al. | |
| 2014/0358710 A1 | 12/2014 | Balestrieri et al. | |
| 2014/0366093 A1 | 12/2014 | Oh et al. | |
| 2015/0106805 A1 | 4/2015 | Melander et al. | |
| 2015/0142878 A1 | 5/2015 | Hebert et al. | |
| 2016/0077846 A1 | 3/2016 | Phillips et al. | |
| 2016/0323377 A1* | 11/2016 | Einkauf | G06F 9/5077 |
| 2016/0378559 A1 | 12/2016 | Bhandarkar et al. | |
| 2017/0063659 A1 | 3/2017 | Platon et al. | |
| 2017/0078433 A1 | 3/2017 | Radhakrishnan et al. | |
| 2017/0090960 A1 | 3/2017 | Anderson et al. | |
| 2017/0090961 A1 | 3/2017 | Wagner et al. | |
| 2017/0115978 A1 | 4/2017 | Modi et al. | |
| 2017/0177413 A1 | 6/2017 | Wisniewski et al. | |
| 2017/0177860 A1 | 6/2017 | Suarez et al. | |
| 2017/0177877 A1 | 6/2017 | Suarez et al. | |
| 2017/0180346 A1 | 6/2017 | Suarez et al. | |
| 2017/0339158 A1 | 11/2017 | Lewis et al. | |
| 2017/0339196 A1 | 11/2017 | Lewis et al. | |
| 2017/0372703 A1 | 12/2017 | Wagner et al. | |
| 2018/0004503 A1 | 1/2018 | OlmstedThompson | |
| 2018/0088993 A1 | 3/2018 | Gerdesmeier et al. | |
| 2018/0101403 A1 | 4/2018 | Baldini Soares et al. | |
| 2018/0129539 A1 | 5/2018 | Sadat | |
| 2018/0150325 A1 | 5/2018 | Kuo et al. | |
| 2018/0246745 A1 | 8/2018 | Aronovich et al. | |
| 2018/0285204 A1 | 10/2018 | Dwarampudi et al. | |
| 2018/0331971 A1 | 11/2018 | Certain et al. | |
| 2019/0050680 A1 | 2/2019 | Waugh et al. | |
| 2019/0102231 A1 | 4/2019 | Wagner | |
| 2019/0108049 A1 | 4/2019 | Singh et al. | |
| 2019/0146774 A1 | 5/2019 | Moore et al. | |
| 2019/0149406 A1 | 5/2019 | Fratini | |
| 2019/0188107 A1 | 6/2019 | Alston et al. | |
| 2019/0243681 A1 | 8/2019 | Chen | |
| 2019/0294477 A1 | 9/2019 | Koppes et al. | |
| 2019/0324786 A1 | 10/2019 | Ranjan et al. | |
| 2019/0340033 A1 | 11/2019 | Ganteaume | |
| 2019/0347127 A1 | 11/2019 | Coady et al. | |
| 2019/0392045 A1 | 12/2019 | De Lima Junior et al. | |
| 2020/0073649 A1 | 3/2020 | Viana et al. | |
| 2020/0142711 A1 | 5/2020 | Varda et al. | |
| 2020/0174842 A1 | 6/2020 | Wang et al. | |
| 2020/0210227 A1 | 7/2020 | Xie et al. | |
| 2020/0213279 A1 | 7/2020 | Xiong et al. | |
| 2020/0241930 A1 | 7/2020 | Garg et al. | |
| 2020/0249977 A1 | 8/2020 | Mentz et al. | |
| 2020/0310845 A1 | 10/2020 | Liguori et al. | |
| 2020/0310850 A1 | 10/2020 | Liguori et al. | |
| 2020/0356387 A1 | 11/2020 | Anwar et al. | |
| 2020/0358719 A1 | 11/2020 | Mestery et al. | |
| 2020/0412596 A1 | 12/2020 | Cherunni | |
| 2021/0064442 A1 | 3/2021 | Alluboyina et al. | |
| 2021/0089361 A1 | 3/2021 | Rafey et al. | |
| 2021/0109775 A1 | 4/2021 | Shen et al. | |
| 2021/0117217 A1 | 4/2021 | Croteau et al. | |
| 2021/0141655 A1 | 5/2021 | Gamage et al. | |
| 2021/0158083 A1 | 5/2021 | Gan et al. | |
| 2021/0160162 A1 | 5/2021 | Abbas | |
| 2021/0184942 A1 | 6/2021 | Tootaghaj et al. | |
| 2021/0191748 A1 | 6/2021 | Ito | |
| 2021/0232344 A1 | 7/2021 | Corrie | |
| 2021/0357255 A1 | 11/2021 | Mahadik et al. | |

OTHER PUBLICATIONS

Chen et al. "VirtualCluster : Customizing the Cluster Environment through Virtual Machines", 2008 IEEE, pp. 411-416.*

Chavan et al. "Clustered Virtual Machines for Higher Availability of Resources with Improved Scalability in Cloud Computing", 2014 IEEE, pp. 221-225.*

Dettori, "Blueprint for Business Middleware as a Managed Cloud Service", IEEE International Conference on Cloud Engineering, 2014, pp. 261-270.

U.S. Appl. No. 16/217,454, filed Dec. 12, 2018, Aithal et al.
U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.

* cited by examiner

CLUSTER SCALING BASED ON TASK STATE INFORMATION

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

DETAILED DESCRIPTION

Introduction

Figure 1:
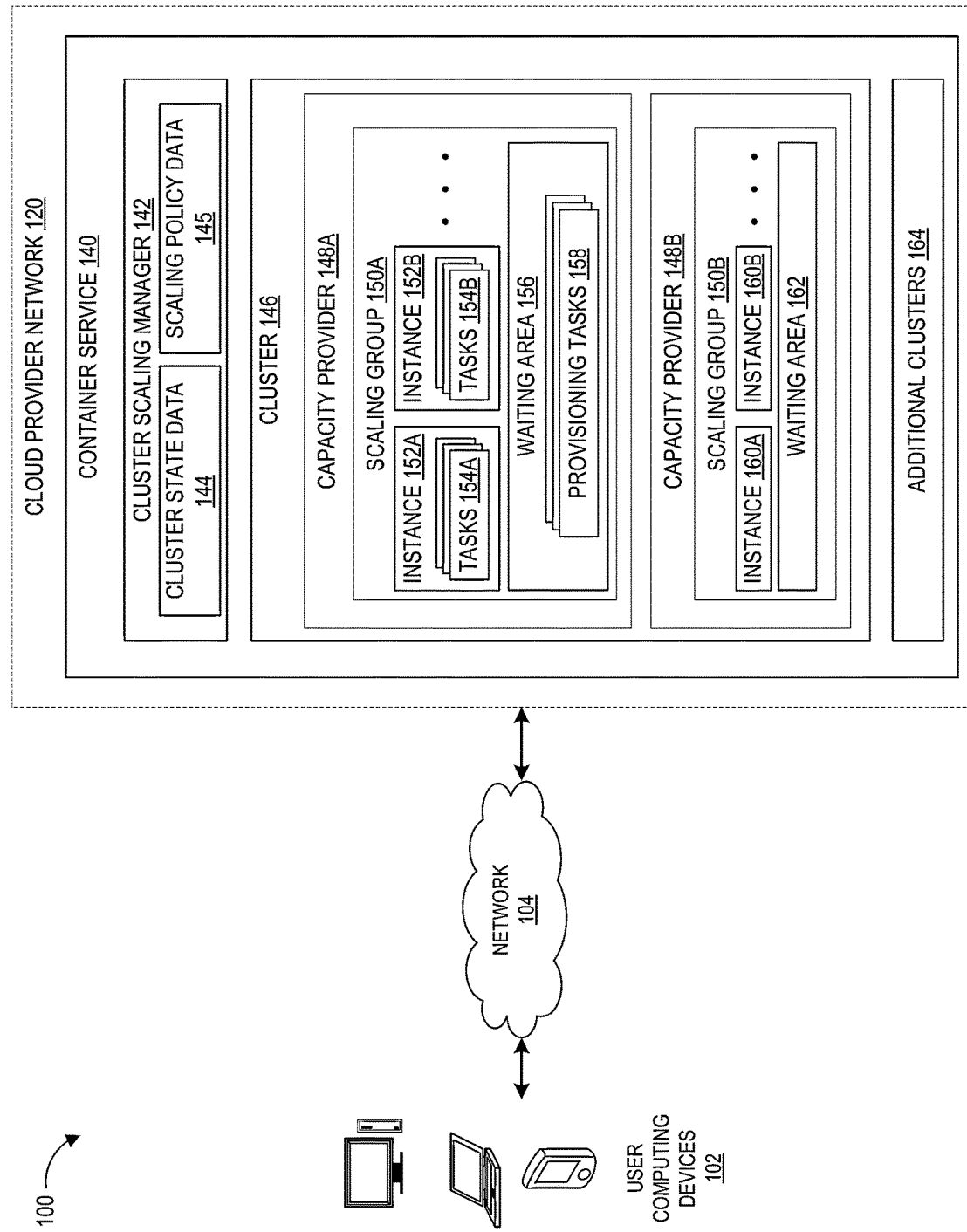
FIG. 1 depicts a schematic diagram of a network environment in which a cloud provider network is used to implement a container service and a cluster scaling manager in accordance with aspects of the present disclosure.

The present disclosure generally relates to improving the process of scaling a cluster of compute capacity. Many software applications can run using one or more computing "clusters," which can include at least one cluster master (which runs control processes including scheduling, resource control, handling API requests, and deciding what runs on the cluster's nodes) and multiple nodes (which are the worker machines that run containerized applications and other workloads). These clusters can be hosted on or across a set of physical machines, which may include a single physical machine or multiple physical machines, in a distributed computing environment such as a cloud provider network.

A developer can package a software application and everything else needed to run the application in a container image (e.g., a standalone, executable package of software that includes everything needed to run an application process) and send a request to the cloud provider network to execute the application in a cluster. In the request, the developer may indicate any information needed to execute the application in the cluster. In response, the cloud provider network may utilize the compute capacity in the cluster to execute the application.

However, if a large number of requests are received, the cluster may run out of available compute capacity and may need to reject some of those requests and either try to process those requests again later or drop them entirely. One solution to avoid having insufficient compute capacity in the cluster is always keeping an ample amount of spare compute capacity in the cluster. However, doing so may result in an unnecessarily high cost of having to maintain unused compute capacity at all times.

The aforementioned challenges, among others, is addressed in some embodiments by the disclosed techniques for scaling a cluster of compute capacity such that the amount of additional compute capacity added to a given cluster is proportional to the number of requests received by the system but cannot be handled due to the lack of sufficient compute capacity in the cluster.

More specifically, the presently disclosed technology addresses these deficiencies by maintaining a waiting area in which tasks (which are also referred to herein as provisioning tasks) that are requested to be executed in a cluster, but are not able to be accommodated in the cluster due to the cluster not having sufficient compute capacity usable to execute such tasks, are stored. When provisioning tasks are stored in the waiting area, the amount of compute capacity to be added to the cluster can be determined based on the characteristics (e.g., number, type, required resources, etc.) of the provisioning tasks in the waiting area.

By basing the amount of compute capacity to be added to the cluster on the characteristics of the provisioning tasks in the waiting area, the presently disclosed technology can eliminate or reduce the cost associated with adding too much compute capacity to the cluster, while minimizing or reducing the time it takes to reach the desired level of compute capacity that can accommodate all of the requested tasks, thereby providing an improved and more efficient cluster scaling experience to the user.

As will be appreciated by one of skill in the art in light of the present disclosure, the embodiments disclosed herein improve the ability of computing systems, such as container systems and code execution systems, to provide more efficient scaling techniques in connection with code execution on clusters provided by a cloud provider network. By utilizing the information about the state of the cluster, including the characteristics of the provisioning tasks in the waiting area, in scaling the cluster, the cloud provider network of the present disclosure can address the deficiencies described above.

Prior techniques generally relied on adding or removing compute capacity based on resource utilization of the compute capacity currently in the cluster. However, such approaches would account for how many requests are being sent to the cluster and failing due to the lack of sufficient compute capacity (e.g., each virtual machine in the cluster may be at 80% but a series of larger tasks may have failed without the scaling system being aware of it). In contrast, embodiments of the present disclosure enable the scaling system to be aware of such situations and adjust the amount of compute capacity to be added to (or removed from) the cluster accordingly, thereby reducing the cost associated with adding too much compute capacity to the cluster and also reducing the time it takes to reach the desired level of compute capacity that can accommodate all of the requested tasks.

The presently disclosed embodiments therefore address technical problems inherent within computing systems, such as the latency and computing resource cost associated with scaling a cluster on a cloud provider network. These technical problems are addressed by the various technical solutions described herein, including determining the amount of compute capacity to be added to the cluster based on the characteristics of the provisioning tasks in the waiting area.

Thus, the present disclosure represents an improvement on existing software execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service

FIG. 1 depicts an example computing environment 100 including a cloud provider network 120 in which the disclosed container service and cluster scaling manager can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for scaling a cluster of compute capacity may be implemented in non-elastic computing environments as well.

The cloud provider network 120 can be accessed by user computing devices 102 over a network 104. The cloud provider network 120 may include a container service 140 (referred to in various implementations as a container service, cloud container service, container engine, or container cloud service) and one or more other services not illustrated in FIG. 1 that are in networked communication with one another and with the network 104 to provide users with on-demand access to the services and resources provided by the cloud provider network 120.

In the example of FIG. 1, the container service 140 provides a cluster scaling manager 142, a cluster 146, and additional clusters 164. The cluster scaling manager 142 manages the scaling of the clusters 146 and 164, which may include adding additional compute capacity to the clusters when such additional compute capacity is needed to accommodate incoming task execution requests, and/or removing existing compute capacity from the clusters when incoming task execution requests can be accommodated using a smaller amount of compute capacity (e.g., to reduce costs associated with maintaining the compute capacity in the clusters).

The cluster scaling manager 142 may scale the clusters based on cluster state data 144, which may include information indicative of the current state of the clusters managed by the cluster scaling manager 142. For example, such information may include the identity of each cluster managed by the cluster scaling manager 142, the identity of each capacity manager associated with each cluster, the identity of the scaling group associated with each capacity manager, the number of instances currently in each scaling group, the number of occupied instances in each scaling group, the number of empty instances in each scaling group, the target number of instances for each scaling group, the characteristics (e.g., size, amount of computing resources, type, etc.) of each instance in the scaling group, the number of provisioning tasks in the waiting area due to not being able to be executed on any of the existing instances in the corresponding scaling group, the computing resource requirements of each provisioning task, the computing resource requirements of each active task currently executing on an instance in the scaling group, and the like.

Additionally, the cluster scaling manager 142 may scale the clusters based on scaling policy data 145, which may include information regarding how the clusters are to be scaled. For example, the scaling policy data 145 may indicate a buffer size (e.g., a number of empty instances that should be kept in the scaling group), how many instances to add to or remove from the scaling group in response to changes in the instance utilization, how many instances to add to or remove from the scaling group in response to changes in the number of incoming task launch requests or the rate at which the task launch requests are received, minimum scaling step size, maximum scaling step size, and the like.

The cluster 146 is associated with a capacity provider 148A and a capacity provider 148B, where the capacity provider 148A is configured to manage a scaling group 148A, and the capacity provider 148B is configured to manage a scaling group 148B. A capacity provider, as described herein, is a logical construct that provides an association between a cluster (e.g., cluster 146A) and a scaling group (e.g., scaling group 150A). The association provided by the capacity provider allows the information regarding the state of the clusters (e.g., the cluster state data 144) to be used by the corresponding scaling group in adding and/or removing instances as the number of incoming task execution requests rises or subsides or as the scaling policy (e.g., the scaling policy data 145) for scaling the cluster changes. Capacity providers determine the infrastructure that tasks in a cluster run on. One or more capacity providers are specified in a capacity provider strategy, which is then associated with a cluster. A capacity provider strategy determines how the tasks are spread across the cluster's capacity providers. When a user runs a task or creates a service, the user may either use the cluster's default capacity provider strategy or specify a capacity provider strategy that overrides the cluster's default strategy.

As shown in FIG. 1, the instances 152A and 152B have tasks 154A and 154B executing thereon, respectively. Tasks that are currently executing are also referred to herein as active tasks. The scaling group 150A is also associated with a waiting area 156, which includes provisioning tasks 158 that were not able to be placed on one of the instances in the scaling group 150A, for example, due to the scaling group 150A having insufficient available compute capacity (e.g., none of the instances 152 had a sufficient amount of available computing resources or satisfied the execution requirements of the provisioning tasks 158.). As the active tasks 154 finish executing or become terminated and removed from the instances 152, one or more of the provisioning tasks 158 may be placed on the instances 154 for execution. Similarly, the scaling group 150B includes instances 160A and 160B for executing tasks thereon and a waiting area 162 for storing provisioning tasks.

Although some embodiments of the present disclosure are described with reference to the instances 152 and 160 that are part of the cloud provider network 120, in other embodiments, the techniques described herein are applied to one or more instances that are outside the cloud provider network 120 (e.g., implemented using the user computing devices 102 and/or other on-premises computing resources). Additionally, although FIG. 1 shows clusters 146 and 164, in other embodiments, any number of clusters (e.g., 0, 1, 2, 5, or 100) may be part of the container service 140 and/or managed by the cluster scaling manager 142. The scaling groups 150A and 150B can include any number of instances, including 0 instances. For example, a scaling group may include 0 instances to conserve computing resources, and in response to a task execution request (or when such a task execution request is expected to be received), one or more instances can be added to the scaling group to provide the necessary compute capacity to execute the requested task(s).

The container service 140 may provide the compute capacity used in the cluster 146 (e.g., instances 152 and 160) using the services provided by a compute service (not illustrated in FIG. 1) of the cloud provider network 120. Such a compute service may include one or more servers which provide resizable computing capacity to users for building and hosting their software systems. The compute service and associated control plane functionality can provide an elastic compute cloud service of the cloud provider network 120. Compute resources can be provided from the compute service to customers via an elastic compute cloud service (referred to in various implementations as an elastic compute service, a virtual machines service, a computing cloud service, a compute engine, or a cloud compute service). Users can use the compute service to launch as many virtual computing environments, referred to as virtual compute instances, virtual machine instances, virtual machines, or collectively as "instances," as they need. Instances can have various configurations of processing power, memory, storage, and networking capacity depending upon user needs. The compute service can also include computer storage for temporary data used while an instance is running; however, as soon as the instance is shut down this data is lost.

The cloud provider network 120 may provide the instances (also referred to as virtual compute instances, compute instances, virtual machine instances, or virtual machines) shown in FIG. 1 with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Although the instances 152 and 160 are used as examples in FIG. 1, the compute resources usable by the clusters 146 and 164 include one or more of physical machines, virtual machines, containers, nodes, or other forms of virtual or physical compute units that are configured to execute one or more applications.

In some implementations, at least a subset of virtualization management tasks may be performed at one or more offloading cards so as to enable more of the processing capacity of the host to be dedicated to client-requested compute instances, e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The container service 140 may provide a set of application programming interfaces ("APIs") that can be used by the users of the user computing devices 102 to add, modify, or remove scaling policies according to which the clusters and/or the scaling groups are to be scaled; add, modify, or remove compute capacity to the clusters; and/or request execution of user applications (e.g., tasks) on the clusters. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, a task refers to a container, or multiple containers working together, running to execute the functionality of a software application or a particular component of that application. A cluster refers to a logical grouping of tasks. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of a cloud provider network 120 can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

Some implementations of the cloud provider network 120 can additionally include object storage servers, block store servers, domain name services ("DNS") servers, relational database servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable "virtual computing devices" via their use of the clusters 146 and 164 and/or the instances 152 and 160 illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for scaling a cluster of compute capacity can be implemented as part of a virtual compute service, container service, or Kubernetes-based container service in some embodiments.

Example State of Scaling Group

Figure 2:
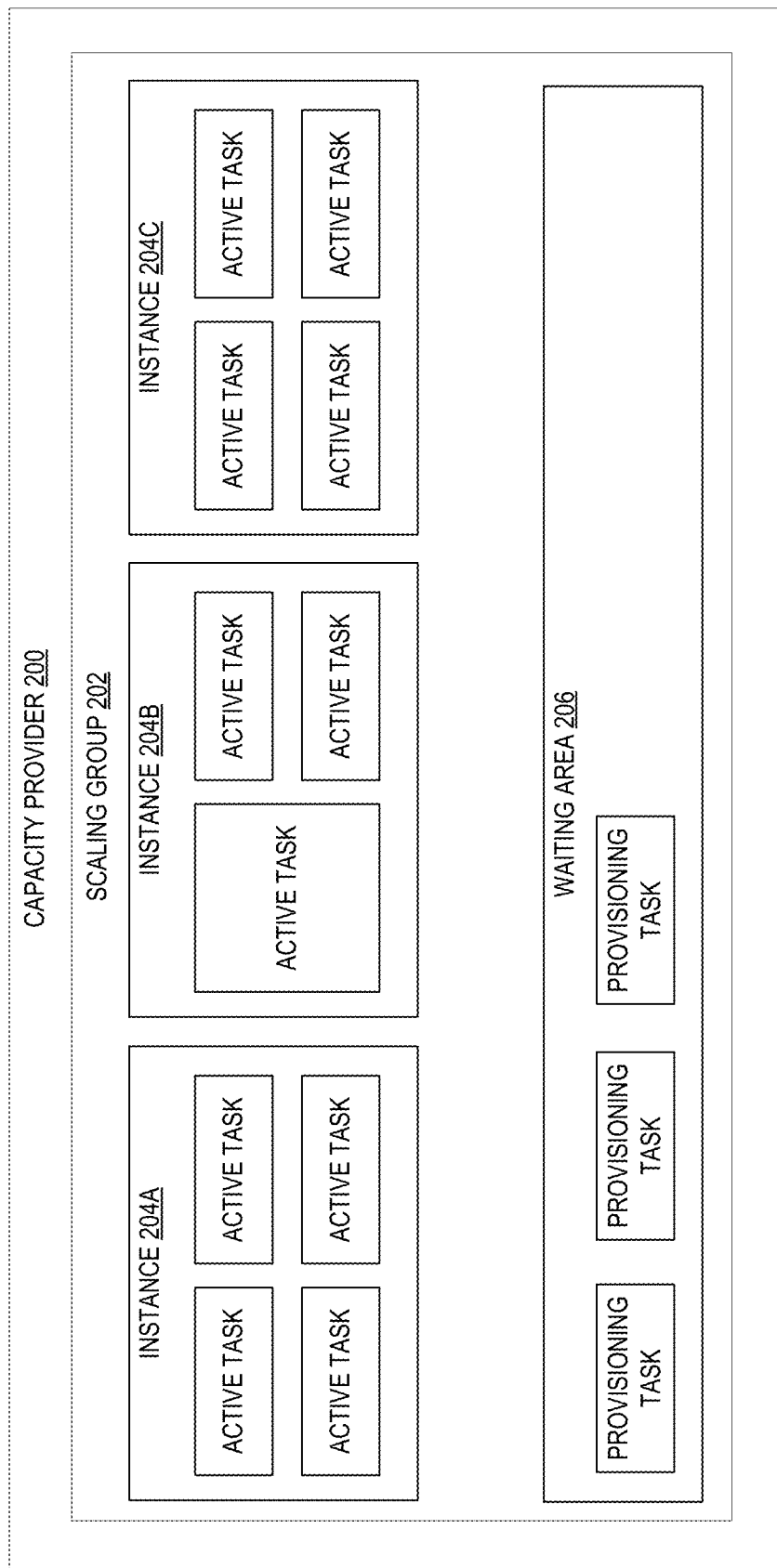
FIG. 2 depicts a block diagram of an example state of a scaling group associated with a capacity provider in accordance with aspects of the present disclosure.

FIG. 2 block diagram of an example state of a scaling group 202 associated with a capacity provider 200 in accordance with aspects of the present disclosure. As shown in FIG. 2, the scaling group 202 includes instances 204A, 204B, and 204C, and each instance is occupied with various active tasks executing thereon. The scaling group 202 also includes a waiting area 206, which includes three provisioning tasks awaiting execution on one or more of the instances 204. Each task may be associated with a specific set of memory, CPU, port, networking interface, and/or GPU requirements to execute the task. When a request to execute a task with the capacity provider 200 is received by the container service 140, but none of the instances in the scaling group 202 has sufficient memory, CPUs, ports, networking interfaces, and/or GPUs needed to run the task, the task may be placed in the waiting area 206 until such an instance becomes available in the scaling group 202. One or more of the tasks may have different requirements, and one or more of the instances may have different configurations (e.g., instance type, amount of computing resources, etc.).

The scaling group 202 or the capacity provider 200 may be associated with a scaling policy that indicates a target size of the scaling group 202, and the target size may be updated based on the change in the number of incoming task execution requests and/or the number of provisioning tasks in the waiting area 206. In some embodiments, the target size of scaling group indicates the amount of compute capacity (e.g., the number of instances) that the scaling group will try to maintain in the scaling group by adding and removing compute capacity as needed. For example, in the example of FIG. 2, the target size may have previously been set to 3 instances, and in response to the waiting area 206 having 3 provisioning tasks, the target size may be updated to 4 so that the scaling group 202 has enough compute capacity to accommodate all of the active tasks and all of the provisioning tasks (e.g., based on a determination that adding one more instance to the scaling group would provide the scaling group with compute capacity sufficient to accommodate the provisioning tasks). Additionally, the scaling policy associated with the scaling group 202 (or the capacity provider 200) may specify that the scaling group 202 should maintain at least a specific number of empty instances (also referred to herein as buffer size), for example, to be able to accommodate an unexpected surge of task execution requests. The cluster scaling manager 154 may consider the number of provisioning tasks, the number of empty instances in the scaling group 202, the buffer size associated with the scaling group 202, among other factors, in setting the target size of the scaling group 202. Additionally or alternatively, the cluster scaling manager 154 may set the target size of the scaling group 202 in response to a user input (e.g., from an administrator user or owner user of the cluster). Although size and number of instances are used as example targets, other types of targets may be used. For example, utilization may be used as a target, such that target utilization is set to 60% (e.g., the number of instances currently executing one or more tasks divided by the total number of instances in the scaling group), and if the utilization for the scaling group exceeds 60%, the scaling group may add more compute capacity to bring the utilization back down to 60%. In some embodiments, instead of utilization at the instance level, utilization of specific resources such as CPU, memory, networking, and/or disk resources may be used as a target to add or remove compute capacity as needed to bring the current utilization value to the target value.

Figure 3:
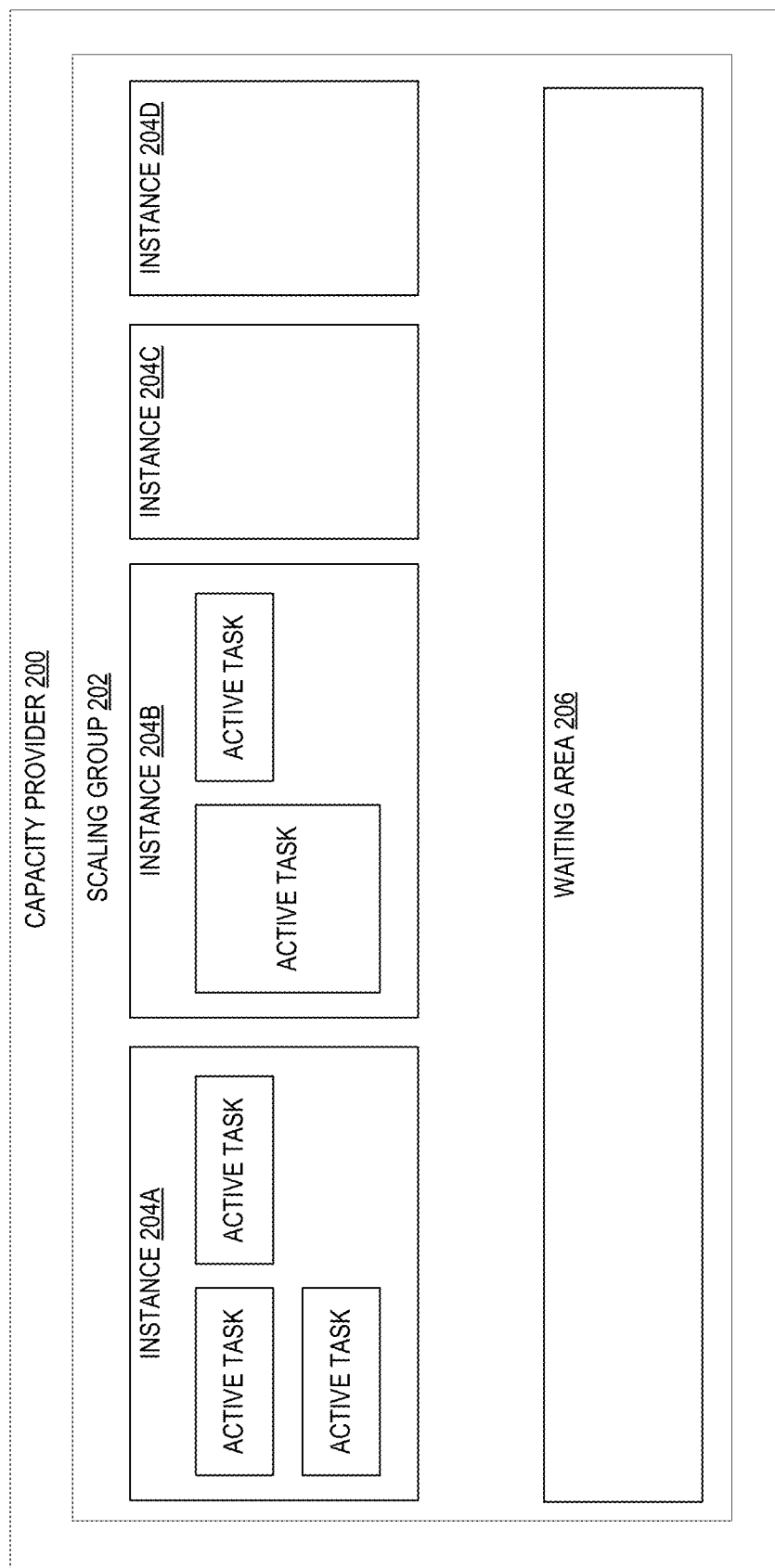
FIG. 3 depicts a block diagram of another example state of a scaling group associated with a capacity provider in accordance with aspects of the present disclosure.

FIG. 3 depicts a block diagram of another example state of the scaling group 202 associated with the capacity provider 200 in accordance with aspects of the present disclosure. As shown in FIG. 3, the instances 204A and 204B have finished executing some of the active tasks, the instance 204C has finished executing all of its active tasks, and instance 204D has been added to the scaling group 202. Since there is available room in the instances 204, the waiting area 212 is also empty, and any incoming task would be placed in one of the instances 204 instead of the waiting area 212. Depending on how long some or all of the instances 204 remain empty, the cluster scaling manager 154 may reduce the target size of the scaling group 202 (e.g., to 2 instances, in response to the cluster scaling manager 154 determining that 2 instances can accommodate all of the tasks whose execution is requested in the scaling group 202, as shown in FIG. 3).

Example Routine for Processing a Task Execution Request

Figure 4:
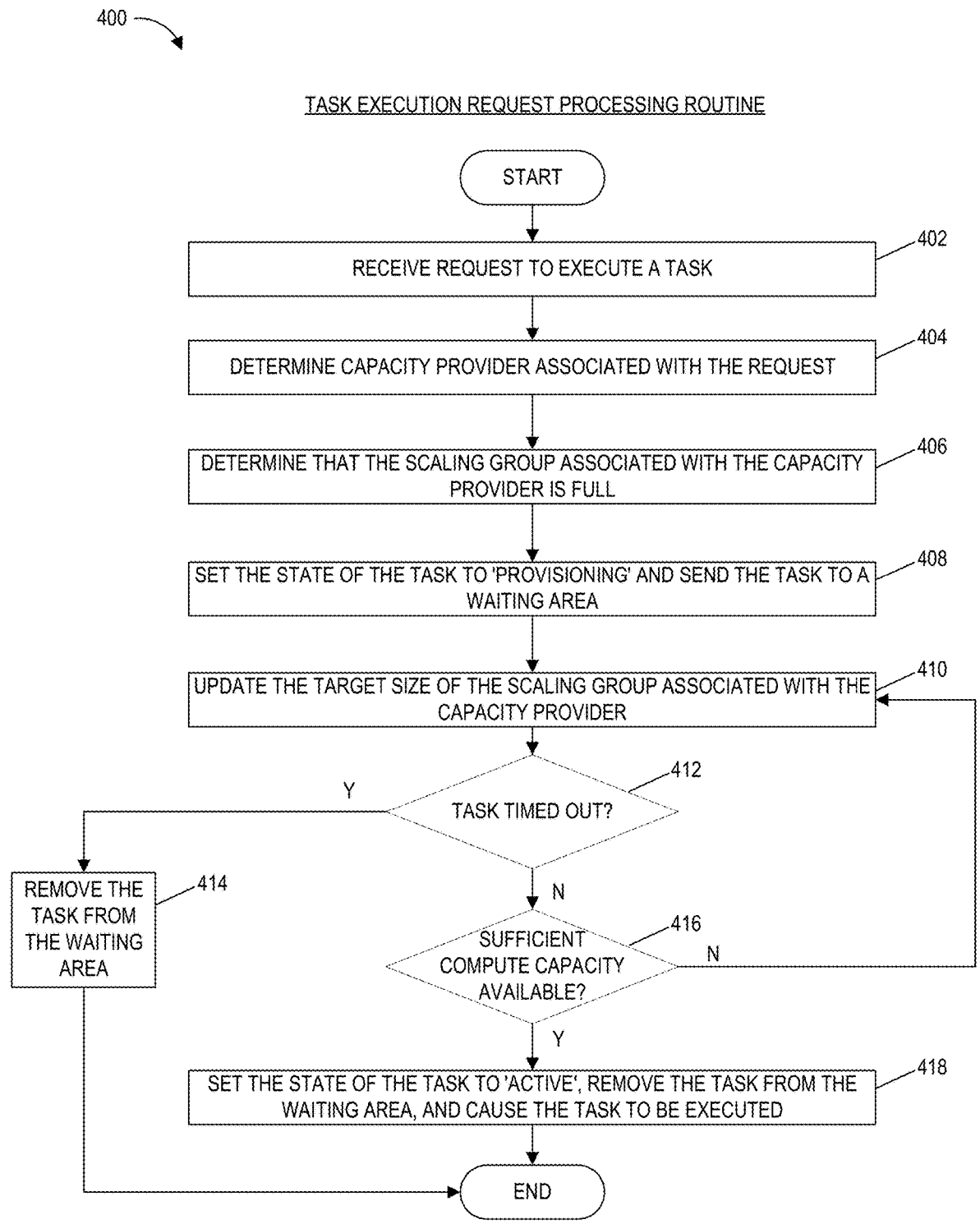
FIG. 4 is a flowchart of an example process for processing a task execution request in accordance with aspects of the present disclosure.

FIG. 4 depicts an illustrative routine 400 for processing a task execution request in accordance with aspects of the present disclosure. The routine 400 may be carried out, for example, by the container service 140 (or a component thereof such as the cluster scaling manager 142) or one or more other components of the cloud provider network 120 described herein. For convenience, some or all of the steps of the routine 400 are described as being performed by the cluster scaling manager 142. For example, the cluster scaling manager 142 may include or be implemented on one or more hardware computing devices and non-transitory physical computer storage. The non-transitory physical computer storage may store instructions that, when executed by the one or more hardware computing devices, cause the one or more hardware computing devices to perform the steps of the routine 400.

The routine 400 begins at block 402, at which the cluster scaling manager 142 receives a request to execute a task. The request may identify the cluster in which the task is to be executed and the capacity provider to be used to provide the compute capacity usable to execute the task. Additionally, the request may include a task definition indicating the one or more container images needed to execute the task and one or more computing resource requirements associated with the task. Although the example of FIG. 4 illustrates processing a single task execution request, in some embodiments, the container service 140 may receive a group of requests with an indication of how the requests should be distributed across the capacity providers associated with the cluster.

At block 404, the cluster scaling manager 142, based on the request, determines the capacity provider associated with the request. The cluster scaling manager 142 may manage multiple capacity managers that are each configured to provide compute capacity of a different type. For example, one capacity manager may provide non-interruptible on-demand virtual machine instances usable to execute incoming tasks, and another capacity manager may provide interruptible spot virtual machine instances usable to execute incoming tasks. The non-interruptible on-demand virtual machine instances may be added to the corresponding scaling group more quickly (due to its on-demand nature) and may continue to exist in the scaling group once added (due to its non-interruptible nature) unless its termination or removal is requested by the user of the cluster or the container service 140. On the other hand, the interruptible spot virtual machine instances may not be available to be added to the corresponding scaling group right way or on demand (due to its nature of being spot instances) and may not be guaranteed to exist in the scaling group until its task executions are completed (due to its interruptible nature). In some embodiments, the user may create a capacity provider usage policy that indicates how the incoming requests should be distributed across the capacity providers associated with the cluster, and associate the capacity provider usage policy with the cluster generally (e.g., so that all incoming requests are distributed according to the capacity provider usage policy) or with a specific group of requests so that the group of requests can be distributed according to the capacity provider usage policy). For example, the capacity provider usage policy may indicate a ratio (e.g., 70% of the requests should be sent to the capacity provider configured to provide non-interruptible on-demand virtual machine instances, and 30% of the requests should be sent to the capacity provider configured to provide interruptible spot virtual machine instances) and/or indicate a number of requests to be sent to one or more of the capacity providers (e.g., send the first 100 requests to the first capacity provider, then split any subsequent requests among the first and second capacity providers 6:4). As another example, the capacity provider usage policy may condition the usage of a capacity provider on an adequate amount of compute capacity being available in the scaling group associated with the capacity provider (e.g., send this request to the capacity provider for spot instances if the task can be placed on an instance right away, if not send it to the capacity provider for on-demand instances). As yet another example, the capacity provider usage policy may combine some or all of the indications/conditions described above. Although this example is described with reference to two capacity providers, in other examples, any other number of capacity providers may be used.

At block 406, the cluster scaling manager 142 determines that the scaling group associated with the capacity provider is full. For example, none of the instances in the scaling group may have sufficient computing resources to accommodate the task.

At block 408, the cluster scaling manager 142 sets the state of the task to "provisioning" and sends the task to the waiting area associated with the capacity provider.

At block 410, the cluster scaling manager 142 updates the target size of the scaling group associated with the capacity provider. For example, the cluster scaling manager 154 may consider the number and type of the provisioning tasks in the waiting area, among other factors, in updating the target size of the scaling group. Once the target size of the scaling group is updated, the scaling group may acquire any additional compute capacity needed to meet the target size, for example, from an instance provisioning service. The techniques for updating the target size is described in greater detail below with reference to FIG. 5.

At block 412, the cluster scaling manager 142 determines whether the task has timed out (e.g., by reaching a timeout period associated with the task, where the timeout period indicates the maximum amount of time that the task is allotted to the task to be placed on an instance for execution). If the task has timed out, the routine proceeds to block 414, where the task is removed from the waiting area without being successfully executed. Otherwise, the routine proceeds to block 416.

At block 416, the cluster scaling manager 142 determines whether there exists a sufficient amount of compute capacity in the scaling group to execute the task. If the cluster scaling manager 142 determines that the scaling group does not have a sufficient amount of compute capacity to execute the task, the routine proceeds to block 410 to update the target size as needed. If the cluster scaling manager 142 determines that the task in the waiting area can be executed in the scaling group associated with the capacity provider, the routine proceeds to block 418. For example, the cluster scaling manager 142 (or the scaling group) may periodically determine whether the scaling group additional compute capacity has been made available in the scaling group (e.g., due to the execution of another task in the scaling group finishing or terminating) to accommodate any provisioning tasks in the waiting area.

At block 414, the cluster scaling manager 142 sets the state of the task to "active," removes the task from the waiting area, and causes the task to be executed in the scaling group. The routine 400 may then end.

The routine 400 can include fewer, more, or different blocks than those illustrated in FIG. 4 and/or one or more blocks illustrated in FIG. 4 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Updating a Target Scaling Group Size

Figure 5:
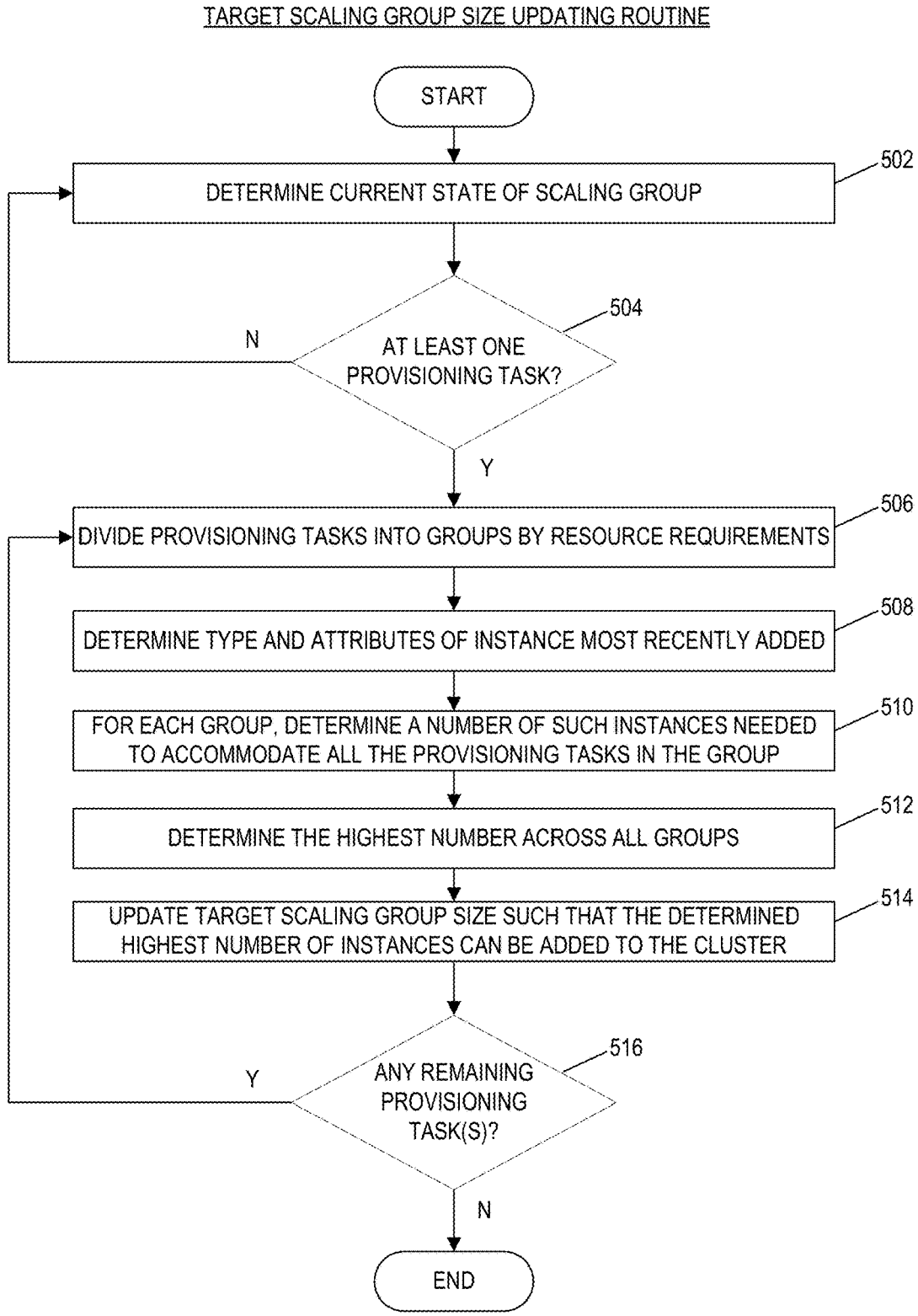
FIG. 5 is a flowchart of an example process for updating a target scaling group size in accordance with aspects of the present disclosure.

FIG. 5 depicts an illustrative routine 500 for updating a target scaling group size in accordance with aspects of the present disclosure. The routine 500 may be carried out, for example, by the container service 140 (or a component thereof such as the cluster scaling manager 142) or one or more other components of the cloud provider network 120 described herein. For convenience, some or all of the steps of the routine 400 are described as being performed by the cluster scaling manager 142. For example, the cluster scaling manager 142 may include or implemented on one or more hardware computing devices and non-transitory physical computer storage storing instructions that, when executed by the one or more hardware computing devices, cause the one or more hardware computing devices to perform the steps of the routine 400.

The routine 500 begins at block 502, at which the cluster scaling manager 142 determines the current state of a scaling group managed by one of the capacity providers associated with the cluster scaling manager 142. For example, the cluster scaling manager 142 may do so by accessing the cluster state data 144, which may indicate the identity of each cluster managed by the cluster scaling manager 142, the identity of each capacity manager associated with each cluster, the identity of the scaling group associated with each capacity manager, the number of instances currently in each scaling group, the number of occupied instances in each scaling group, the number of empty instances in each scaling group, the target number of instances for each scaling group, the characteristics (e.g., size, amount of computing resources, type, etc.) of each instance in the scaling group, the number of provisioning tasks in the waiting area due to not being able to be executed on any of the existing instances in the corresponding scaling group, the computing resource requirements of each provisioning task, the computing resource requirements of each active task currently executing on an instance in the scaling group, and the like.

At block 504, the cluster scaling manager 142 determines whether the waiting area associated with the scaling group includes at least one provisioning task. If the cluster scaling manager 142 determines that the waiting area associated with the scaling group does not include at least one provisioning task, the routine 500 proceeds to block 502. If the cluster scaling manager 142 determines that the waiting area associated with the scaling group includes at least one provisioning task, the routine proceeds to block 506.

At block 506, the cluster scaling manager 142 divides the provisioning tasks in the waiting area into groups such that each provisioning task in a given group has the same computing resource requirements. For example, if two tasks in the waiting room requires four units of memory and two units of CPU, and three tasks in the waiting room requires 10 units of memory and 1 unit of CPU, the cluster scaling manager 142 may divide up the provisioning tasks into two groups.

At block 508, the cluster scaling manager 142 determines the type and attributes of the instance that was most recently added to the scaling group. In some embodiments, the cluster scaling manager 142 may use a default instance size and/or type.

At block 510, the cluster scaling manager 142 determines, for each group, a minimum number of such instances (e.g., having the type and attributes determined at block 508) that could accommodate all of the provisioning tasks in the group. For example, if each instance had 12 units of memory and 4 units of CPU, for the first group in the example above, the minimum number of instances would be 1 (needing 8 units of memory and 4 units of CPU total), and for the second group, the minimum number of instances would be 3 (needing 30 units of memory and 3 units of CPU total).

At block 512, the cluster scaling manager 142 determines the highest number across all of the groups. In the example above, the highest number would be 3 (first group had 1, second group had 3).

At block 514, the cluster scaling manager 142 updates the target size of the scaling group so that the determined highest number of instances can be added to the cluster. For example, if the current target size is 5, the target size may set to 8. In the event that the scaling group has restrictions such as a minimum scaling step size and/or a maximum scaling step size, the updated target size should be greater than the current target size (or the number of instances currently in the scaling group) by at least the minimum scaling step size, and the current target size (or the number of instances currently in the scaling group) by no more than the maximum scaling step size.

As another example of updating the target size of the scaling group, assuming that the current target size of the scaling group is 10 instances and the scaling group currently includes 10 instances, cluster scaling manager 142, based on determining that 3 additional instances are needed to accommodate the provisioning tasks in the waiting area, may provide an indication (e.g., to a metrics logging or monitoring service within the cloud provider network 120) that the scaling group is currently at 130% utilization (e.g., meaning that all of the 10 instances are executing tasks and there should be 3 more instances in the scaling group executing the provision tasks in the waiting area). In response, the logging or monitoring service may trigger an alarm, based on the 130% utilization value exceeding the target utilization value of 100% associated with the scaling group, causing the scaling group to add additional compute capacity to the scaling group to bring down the current reported utilization value of %10 to the target utilization value of 100%. The scaling group may do that by adding 3 instances to the 10 instances currently in the scaling group. The 3 newly added instances would create room in the scaling group to accommodate the provisioning tasks in the waiting area, which may bringing the utilization value of the scaling group down to 100% (e.g., all 13 instances in the scaling group are being used, without any provisioning tasks in the waiting area).

At block 516, the cluster scaling manager 142 determines whether there are any remaining provisioning task(s) in the waiting area associated with the scaling group. If the cluster scaling manager 142 determines that there are remaining provisioning task(s) in the waiting area associated with the scaling group, the routine proceeds to block 506 and the steps of blocks 506-514 may be repeated. If the cluster scaling manager 142 determines that there is no remaining provisioning task in the waiting area associated with the scaling group, the routine 500 may then end.

The routine 500 can include fewer, more, or different blocks than those illustrated in FIG. 5 and/or one or more blocks illustrated in FIG. 5 may be modified, omitted, or switched without departing from the spirit and scope of the description. For example, in some embodiments, at block 512, the cluster scaling manager 142 may instead sum the number of instances determined for each group, and use the sum to update the target size at block 514. In another example, the cluster scaling manager 142 may use another number between the highest number across all the groups and the sum of the numbers determined for the groups (e.g., midpoint between the highest number and the sum). In some embodiments, the user configuring the scaling policy for the cluster may be able to specify which policy (e.g., how close the number should be to the highest number vs. the sum) should be used for scaling the cluster. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Container Service

Figure 6:
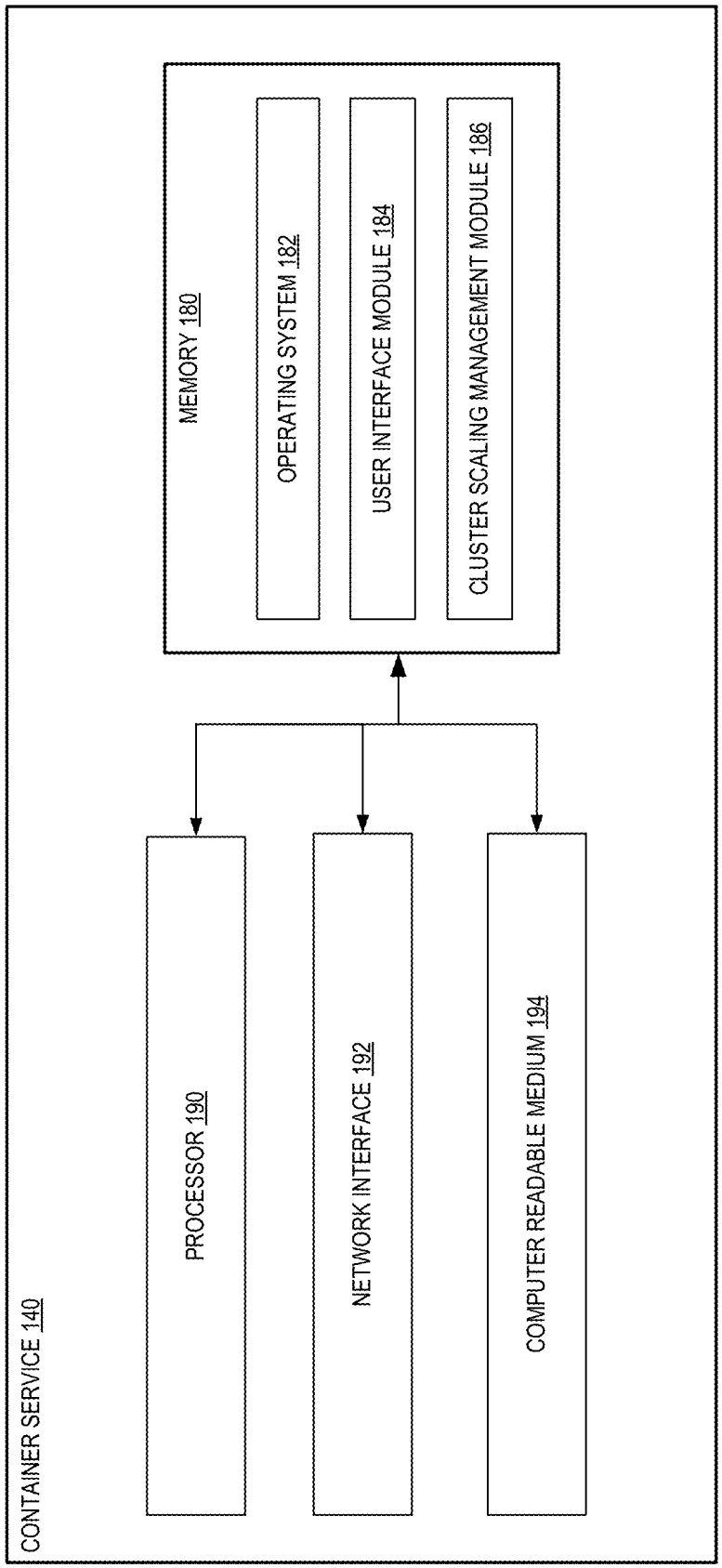
FIG. 6 depicts a general architecture of a computing device or system providing a container service in accordance with aspects of the present disclosure.

FIG. 6 depicts an example architecture of a computing system (referred to as the container service 140) that can be used to perform one or more of the techniques described herein or illustrated in FIGS. 1-5. The general architecture of the container service 140 depicted in FIG. 6 includes an arrangement of computer hardware and software modules that may be used to implement one or more aspects of the present disclosure. The container service 140 may include many more (or fewer) elements than those shown in FIG. 6. It is not necessary, however, that all of these elements be shown in order to provide an enabling disclosure. As illustrated, the container service 140 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the container service 140. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a cluster scaling management module 186 that may be executed by the processor 190. In one embodiment, the cluster scaling management module 186 implements various aspects of the present disclosure, e.g., those illustrated in FIGS. 1-5 or described with reference to FIGS. 1-5.

While the cluster scaling management module 186 is shown in FIG. 6 as part of the container service 140, in other embodiments, all or a portion of the cluster scaling management module 186 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the container service 140. It will also be appreciated that, in some embodiments, a user computing device (e.g., the user computing device 102 of FIG. 1) may implement functionality that is otherwise described herein as being implemented by the elements and/or modules of the container service 140. For example, the user computing device 102 may receive code modules or other instructions from the container service 140 and/or other components of the cloud provider network 120 via the network 104 that are executed by the user computing device 102 to implement various aspects of the present disclosure.

Although a single processor, a single network interface, a single computer-readable medium, and a single memory are illustrated in the example of FIG. 6, in other implementations, the container service 140 can have a multiple of one or more of these components (e.g., two or more processors and/or two or more memories).

Enumerated Implementations (EIs)

Some examples of enumerated implementations (EIs) are provided in this section, without limitation.

EI 1: A cloud provider system comprising: a set of clusters hosted on or across a set of physical machines, wherein a cluster of the set of clusters includes compute capacity usable to execute tasks; a set of capacity providers associated with the cluster and configured to provide compute capacity to the cluster for executing tasks in the cluster, wherein each capacity provider in the set of capacity providers is associated with a scaling group configured to adjust an amount of compute capacity in the scaling group; and a container service comprising computer hardware, wherein the container service is configured to at least: receive, from a user computing device, a request to execute a task in the cluster, wherein the request includes a capacity provider identifier; determine, based at least in part on the first capacity provider identifier, that a first capacity provider of the set of capacity providers is to be used to execute the task; determine that a first scaling group associated with the first capacity provider does not have compute capacity sufficient to execute the task, wherein the first scaling group has a first amount of compute capacity; cause the task to be sent to a waiting area configured to store provisioning tasks that were not able to be executed immediately due to the first scaling group not having enough available compute capacity; determine, based at least in part on a set of provisioning tasks stored in the waiting area, an amount of additional compute capacity to be added to the first scaling group; cause the amount of additional compute capacity to be added to the first scaling group such that the first scaling group has a second amount of compute capacity greater than the first amount; determine that the first scaling group having the second amount of compute capacity has compute capacity sufficient to execute the task; and cause the task to be executed using at least some of the second amount of compute capacity of the first scaling group.

EI 2: The cloud provider system of EI 1, wherein the amount of additional compute capacity is proportional to an amount of computing resources specified by the set of provisioning tasks.

EI 3: The cloud provider system of EI 1, wherein the amount of additional compute capacity comprises a minimum estimated number of virtual machines on which the set of provisioning tasks can be accommodated.

EI 4: The cloud provider system of EI 1, wherein causing the amount of additional compute capacity to be added to the first scaling group comprises increasing a target amount of compute capacity associated with the first scaling group.

EI 5: A computer-implemented method comprising: determining that a cluster of compute capacity is associated with a set of provisioning tasks awaiting execution in the cluster and a set of active tasks executing in the cluster, wherein each provisioning task in the set of provisioning tasks is associated with a computing resource requirement; determining, based at least in part on the computing resource requirement associated with each provisioning task in the set of provisioning tasks, a first amount of additional compute capacity to be added to the cluster; updating a target amount of compute capacity associated with the cluster such that at least the first amount of additional compute capacity is added to the cluster; and executing a first provisioning task in the set of provisioning tasks in the cluster using at least some of the first amount of additional compute capacity added to the cluster.

EI 6: The computer-implemented method of EI 5, further comprising determining the first amount of additional compute capacity to be added to the cluster without considering utilization information associated with compute capacity currently in the cluster.

EI 7: The computer-implemented method of EI 5, wherein the first amount of additional compute capacity comprises a specific number of virtual machine instances to be added to the cluster.

EI 8: The computer-implemented method of EI 5, wherein the first amount of additional compute capacity comprises a minimum estimated number of virtual machine instances on which all of the provisioning tasks in the set of provisioning tasks can be accommodated.

EI 9: The computer-implemented method of EI 5, further comprising: determining that a subset of provisioning tasks in the set of provisioning tasks was not able to be placed in the cluster for execution; determining, based at least in part on the subset of provisioning tasks, a second amount of additional compute capacity to be added to the cluster; and further updating the target capacity associated with the cluster such that at least the second amount of additional compute capacity is added to the cluster.

EI 10: The computer-implemented method of EI 5, wherein determining the first amount of additional compute capacity to be added to the cluster comprises: dividing the set of provisioning tasks into a plurality of subsets of provisioning tasks, wherein each provisioning task in a given subset of the plurality of subsets of provisioning tasks has the same computing resource requirement; determining, for each subset of the plurality of subsets of provisioning tasks, a number of compute instances needed to accommodate all of the provisioning tasks in the subset; and determining the first amount of additional compute capacity to be added to the cluster based at least in part on the number of compute instances determined for each of the plurality of subsets of provisioning tasks.

EI 11: The computer-implemented method of EI 10, wherein the first amount of additional compute capacity indicates a first number of compute instances to be added to the cluster, wherein the first number is (i) greater than a number of compute instances in the cluster by at least a minimum scaling step size associated with the cluster, and (ii) greater than the number of compute instances in the cluster by no more than a maximum scaling step size associated with the cluster.

EI 12: The computer-implemented method of EI 5, wherein the compute capacity in the cluster comprises at least one of a virtual machine instance, a bare-metal instance, a physical machine, a container, a node, or an offload card.

EI 13: A non-transitory computer-readable medium storing instructions that, when executed by a computing system, cause the computing system to perform operations comprising: determining that a cluster of compute capacity is associated with a set of provisioning tasks awaiting execution in the cluster and a set of active tasks executing in the cluster, wherein each provisioning task in the set of provisioning tasks is associated with a computing resource requirement; determining, based at least in part on the computing resource requirement associated with each provisioning task in the set of provisioning tasks, a first amount of additional compute capacity to be added to the cluster; updating a target amount of compute capacity associated with the cluster such that at least the first amount of additional compute capacity is added to the cluster; and causing a first provisioning task in the set of provisioning tasks to be executed in the cluster using at least some of the first amount of additional compute capacity added to the cluster.

EI 14: The non-transitory computer-readable medium of EI 13, storing further instructions that, when executed by the computing system, cause the computing system to perform operations comprising determining the first amount of additional compute capacity to be added to the cluster without considering utilization information associated with compute capacity currently in the cluster.

EI 15: The non-transitory computer-readable medium of EI 13, wherein the first amount of additional compute capacity comprises a specific number of virtual machine instances to be added to the cluster.

EI 16: The non-transitory computer-readable medium of EI 13, wherein the first amount of additional compute capacity comprises a minimum estimated number of virtual machine instances on which all of the provisioning tasks in the set of provisioning tasks can be accommodated.

EI 17: The non-transitory computer-readable medium of EI 13, storing further instructions that, when executed by the computing system, cause the computing system to perform operations comprising: determining that a subset of provisioning tasks in the set of provisioning tasks was not able to be placed in the cluster for execution; determining, based at least in part on the subset of provisioning tasks, a second amount of additional compute capacity to be added to the cluster; and further updating the target capacity associated with the cluster such that at least the second amount of additional compute capacity is added to the cluster.

EI 18: The non-transitory computer-readable medium of EI 13, wherein determining the first amount of additional compute capacity to be added to the cluster comprises: dividing the set of provisioning tasks into a plurality of subsets of provisioning tasks, wherein each provisioning task in a given subset of the plurality of subsets of provisioning tasks has the same computing resource requirement; determining, for each subset of the plurality of subsets of provisioning tasks, a number of compute instances needed to accommodate all of the provisioning tasks in the subset; and determining the first amount of additional compute capacity to be added to the cluster based at least in part on the number of compute instances determined for each of the plurality of subsets of provisioning tasks.

EI 19: The non-transitory computer-readable medium of EI 18, wherein the first amount of additional compute capacity indicates a first number of compute instances to be added to the cluster, wherein the first number is (i) greater than a number of compute instances in the cluster by at least a minimum scaling step size associated with the cluster, and (ii) greater than the number of compute instances in the cluster by no more than a maximum scaling step size associated with the cluster.

EI 20: The non-transitory computer-readable medium of claim 13, wherein the compute capacity in the cluster comprises at least one of a virtual machine instance, a bare-metal instance, a physical machine, a container, a node, or an offload card.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
   a set of clusters hosted on or across a set of physical machines, wherein a cluster of the set of clusters includes compute capacity;
   a set of capacity providers for providing compute capacity to the cluster for executing tasks in the cluster, wherein each capacity provider in the set of capacity providers is associated with a scaling group for adjusting an amount of compute capacity in the scaling group; and
   a container service comprising one or more processors configured to at least:
      receive, from a user computing device, a request to execute a task in the cluster, wherein the request includes a capacity provider identifier;
      determine, based at least in part on the capacity provider identifier, that a first capacity provider of the set of capacity providers is to be used to execute the task;
      determine that a first scaling group associated with the first capacity provider does not have compute capacity sufficient to execute the task, wherein the first scaling group has a first amount of compute capacity;
      cause the task to be sent to a waiting area for storing provisioning tasks that were not able to be executed immediately due to the first scaling group not having enough available compute capacity;
      determine, based at least in part on a set of provisioning tasks stored in the waiting area, an amount of additional compute capacity to be added to the first scaling group;
      cause the amount of additional compute capacity to be added to the first scaling group such that the first scaling group has a second amount of compute capacity greater than the first amount;
      determine that the first scaling group having the second amount of compute capacity has compute capacity sufficient to execute the task; and
      cause the task to be executed using at least some of the second amount of compute capacity of the first scaling group.

2. The cloud provider system of claim 1, wherein the amount of additional compute capacity is proportional to an amount of computing resources specified by the set of provisioning tasks.

3. The cloud provider system of claim 1, wherein the amount of additional compute capacity comprises a minimum estimated number of virtual machines on which the set of provisioning tasks can be accommodated.

4. The cloud provider system of claim 1, wherein causing the amount of additional compute capacity to be added to the first scaling group comprises increasing a target amount of compute capacity associated with the first scaling group.

5. A computer-implemented method comprising:
   determining that a cluster of compute capacity is associated with a set of provisioning tasks awaiting execution in the cluster and a set of active tasks executing in the cluster, wherein each provisioning task in the set of provisioning tasks is associated with a computing resource requirement;
   determining, based at least in part on the computing resource requirement associated with each provisioning task in the set of provisioning tasks, a first amount of additional compute capacity to be added to the cluster;
   updating a target amount of compute capacity associated with the cluster such that at least the first amount of additional compute capacity is added to the cluster; and
   executing a first provisioning task in the set of provisioning tasks in the cluster using at least some of the first amount of additional compute capacity added to the cluster.

6. The computer-implemented method of claim 5, further comprising determining the first amount of additional compute capacity to be added to the cluster without considering utilization information associated with compute capacity currently in the cluster.

7. The computer-implemented method of claim 5, wherein the first amount of additional compute capacity comprises a specific number of virtual machine instances to be added to the cluster.

8. The computer-implemented method of claim 5, wherein the first amount of additional compute capacity comprises a minimum estimated number of virtual machine instances on which all of the provisioning tasks in the set of provisioning tasks can be accommodated.

9. The computer-implemented method of claim 5, further comprising:
- determining that a subset of provisioning tasks in the set of provisioning tasks was not able to be placed in the cluster for execution;
- determining, based at least in part on the subset of provisioning tasks, a second amount of additional compute capacity to be added to the cluster; and
- further updating the target capacity associated with the cluster such that at least the second amount of additional compute capacity is added to the cluster.

10. The computer-implemented method of claim 5, wherein determining the first amount of additional compute capacity to be added to the cluster comprises:
- dividing the set of provisioning tasks into a plurality of subsets of provisioning tasks, wherein each provisioning task in a given subset of the plurality of subsets of provisioning tasks has the same computing resource requirement;
- determining, for each subset of the plurality of subsets of provisioning tasks, a number of compute instances needed to accommodate all of the provisioning tasks in the subset; and
- determining the first amount of additional compute capacity to be added to the cluster based at least in part on the number of compute instances determined for each of the plurality of subsets of provisioning tasks.

11. The computer-implemented method of claim 10, wherein the first amount of additional compute capacity indicates a first number of compute instances to be added to the cluster, wherein the first number is (i) greater than a number of compute instances in the cluster by at least a minimum scaling step size associated with the cluster, and (ii) greater than the number of compute instances in the cluster by no more than a maximum scaling step size associated with the cluster.

12. The computer-implemented method of claim 5, wherein the compute capacity in the cluster comprises at least one of a virtual machine instance, a bare-metal instance, a physical machine, a container, a node, or an offload card.

13. A non-transitory computer-readable medium storing instructions that, when executed by a computing system, cause the computing system to perform operations comprising:
- determining that a cluster of compute capacity is associated with a set of provisioning tasks awaiting execution in the cluster and a set of active tasks executing in the cluster, wherein each provisioning task in the set of provisioning tasks is associated with a computing resource requirement;
- determining, based at least in part on the computing resource requirement associated with each provisioning task in the set of provisioning tasks, a first amount of additional compute capacity to be added to the cluster;
- updating a target amount of compute capacity associated with the cluster such that at least the first amount of additional compute capacity is added to the cluster; and
- causing a first provisioning task in the set of provisioning tasks to be executed in the cluster using at least some of the first amount of additional compute capacity added to the cluster.

14. The non-transitory computer-readable medium of claim 13, storing further instructions that, when executed by the computing system, cause the computing system to perform operations comprising determining the first amount of additional compute capacity to be added to the cluster without considering utilization information associated with compute capacity currently in the cluster.

15. The non-transitory computer-readable medium of claim 13, wherein the first amount of additional compute capacity comprises a specific number of virtual machine instances to be added to the cluster.

16. The non-transitory computer-readable medium of claim 13, wherein the first amount of additional compute capacity comprises a minimum estimated number of virtual machine instances on which all of the provisioning tasks in the set of provisioning tasks can be accommodated.

17. The non-transitory computer-readable medium of claim 13, storing further instructions that, when executed by the computing system, cause the computing system to perform operations comprising:
- determining that a subset of provisioning tasks in the set of provisioning tasks was not able to be placed in the cluster for execution;
- determining, based at least in part on the subset of provisioning tasks, a second amount of additional compute capacity to be added to the cluster; and
- further updating the target capacity associated with the cluster such that at least the second amount of additional compute capacity is added to the cluster.

18. The non-transitory computer-readable medium of claim 13, wherein determining the first amount of additional compute capacity to be added to the cluster comprises:
- dividing the set of provisioning tasks into a plurality of subsets of provisioning tasks, wherein each provisioning task in a given subset of the plurality of subsets of provisioning tasks has the same computing resource requirement;
- determining, for each subset of the plurality of subsets of provisioning tasks, a number of compute instances needed to accommodate all of the provisioning tasks in the subset; and
- determining the first amount of additional compute capacity to be added to the cluster based at least in part on the number of compute instances determined for each of the plurality of subsets of provisioning tasks.

19. The non-transitory computer-readable medium of claim 18, wherein the first amount of additional compute capacity indicates a first number of compute instances to be added to the cluster, wherein the first number is (i) greater than a number of compute instances in the cluster by at least a minimum scaling step size associated with the cluster, and (ii) greater than the number of compute instances in the cluster by no more than a maximum scaling step size associated with the cluster.

20. The non-transitory computer-readable medium of claim 13, wherein the compute capacity in the cluster comprises at least one of a virtual machine instance, a bare-metal instance, a physical machine, a container, a node, or an offload card.

\* \* \* \* \*